INVENTOR.
Shigeru Todokoro
BY George B. Oujevolk
Attorney

Shigeru Todokoro
INVENTOR.

BY George B. Oujevolk
Attorney

United States Patent Office 3,308,241

Patented Mar. 7, 1967

3,308,241
FM STEREO DEMODULATING DEVICE USING A DIODE RING MODULATOR SWITCHING CIRCUIT

Shigeru Todokoro, Kohoku-ku, Yokohama-shi, Japan, assignor to Tokyo Shibaura Electric Company Limited, Kawasaki-shi, Japan, a corporation of Japan Filed Jan. 20, 1964, Ser. No. 338,725
Claims priority, application Japan, Jan. 23, 1963 (utility model), 38/2,123
1 Claim. (Cl. 179—15)

This invention relates to an improvement relating to a demodulating device for stereophonic composite radio signals adapted to be utilized in radio receivers designed to receive stereophonic broadcasting.

As is well known in the art the demodulating device for stereophonic composite signals is utilized to demodulate stereophonic composite signals produced at the output terminal of a frequency discriminator in an FM receiver whereby to separate the signal into the left and right audio frequency signals. Heretofore the so-called matrix and switching methods have been utilized for this purpose. Generally a complete stereophonic composite signal S(*t*) is represented by the following well known equation:

$$S(t)=(\dot{L}+\dot{R})+(\dot{L}-\dot{R})\cos\omega_s t+P\cos\frac{\omega_s t}{2}t \qquad (1)$$

where L is the left audio frequency signal, R is the right audio frequency signal, $\omega_s t$ is the angular frequency of a subcarrier, P is the amplitude of the pilot subcarrier.

In the Equation 1 the first term $(L+R)$ represents the audio frequency signal in the main channel, the second term $(L-R)\cos\omega_s t$ the sub-channel signal for stereo, hence the suppressed-carrier amplitude modulated subcarrier including the difference information and the third term $$P\cos\frac{\omega_s - t}{2}$$

a pilot sub-carrier having a single frequency.

As more fully discussed below the conventional matrix method requires a special band pass filter and a delay circuit which makes difficult to fabricate a demodulator having good separating characteristics.

While the switching method can obviate disadvantages of the matrix method, the conventional demodulating devices utilizing the switching device were not always satisfactory, especially in that they could not provide separation control over a wide range.

Accordingly the general object of this invention is to improve the demodulating device for stereophonic composite signals utilizing the switching method.

Features of this invention as well as the defects of the prior art demodulating devices can be more fully understood from the following description by referring to the accompanying drawings, in which.

Figure 1:
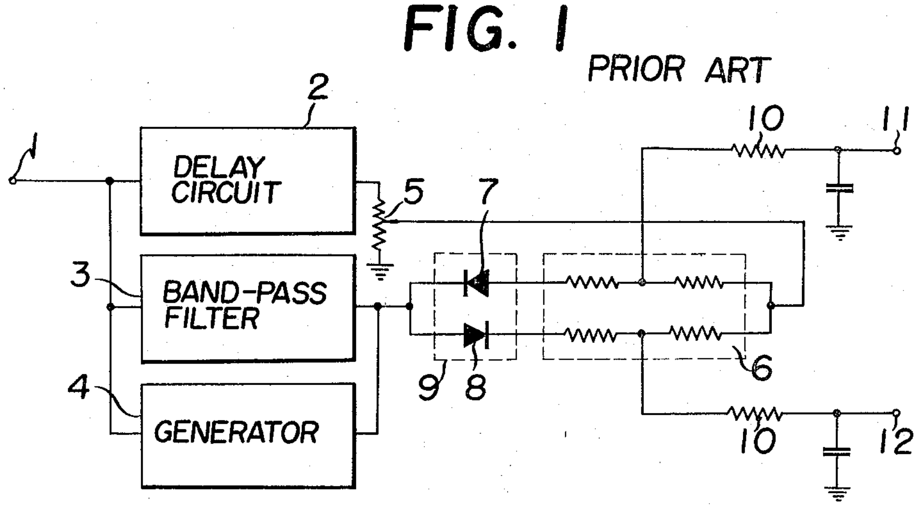
FIG. 1 PRIOR ART
FIG. 1 represents a circuit diagram of a conventional demodulating circuit for stereophonic composite signals utilizing the matrix method.

Referring first to FIG. 1 which shows the circuit diagram of a conventional demodulator for composite signals utilizing matrix method. As shown, stereophonic composite signals are applied simultaneously to a delay circuit 2, a band-pass filter circuit 3 and a generator 4 of a synchronous sub-carrier for insertion. The output of the delay circuit 2 is supplied to a matrix circuit 6 through a variable attenuator 5 while the stereophonic subchannel signal produced by the filter and the sub-carrier for insertion produced by said generator 4 are coupled to an amplitude detector 9 comprising a pair of parallel diodes 7 and 8 of opposite polarities to demodulate the sub-channel signal to produce two sub-channel audio frequency signals of opposite polarities $(L-R)$ and $-(L-R)$, which are supplied to the matrix circuit 6 to be added therein to the main channel signal component of the composite signal produced by said delay circuit 2 whereby producing the separated left (L) and right (R) audio frequency signals at the output terminals, respectively, which are connected to the matrix circuit 6 through resistors 10.

As the above described composite signal demodulating device utilizing the matrix method necessitates a band-pass filter, it requires a number of reactance elements. Moreover, it is difficult to fabricate a filter having a flat characteristic over the band width of the stereophonic sub-channel signal but having a sufficient degree of attenuation. Further, as the sub-channel audio frequency signal demodulated by the band-pass filter has deteriorated frequency characteristic as well as delay characteristic, it is required to insert a delay circuit having similar frequency characteristics and similar delay characteristics also for the main channel signal introduced in the matrix circuit in order to obtain a good separating characteristic. However, the design and manufacture of such a special delay circuit are complicated so that it is difficult to provide excellent characteristics.

While a stereophonic composite signal demodulating device requires a filter for removing the sub-carrier for an SCA channel, it does not require any band-pass filter or delay circuit as does a matrix demodulator and permits the demodulated output to be derived from the balanced points of a bridge circuit with respect to the inserted sub-carrier voltage. Thus, with this device no sub-carrier component is contained in the output signal, thus obviating disadvantages of the matrix method. In demodulating by the switching method, the composite signals are separated and applied to two channels by the action of a switching means driven by the sub-carrier voltage, thus providing the left and right audio frequency signals.

For example, if it is assumed that the composite signal is applied to a channel A during the positive half cycles of the sub-carrier voltage and to a channel B during the negative half cycle, the audio frequency components of the signals appearing in the channels A and B would be represented as follows:

$$\text{Output of the channel } A=\left(\frac{1}{2}+\frac{1}{\pi}\right)\dot{L}+\left(\frac{1}{2}-\frac{1}{\pi}\right)\dot{R} \qquad (2)$$

$$\text{Output of the channel } B=\left(\frac{1}{2}+\frac{1}{\pi}\right)\dot{R}+\left(\frac{1}{2}-\frac{1}{\pi}\right)\dot{L} \qquad (3)$$

Let $\theta$ be the operating time or connection angle of the switch; that is the phase angle during which the switch is conducting, then $$\text{Output of the channel } A=\frac{1}{\pi}\left(\frac{\theta}{2}+\sin\frac{\theta}{2}\right)\dot{L}+\frac{1}{\pi}\left(\frac{\theta}{2}-\sin\frac{\theta}{2}\right)\dot{R} \qquad (4)$$

$$\text{Output of the channel } B=\frac{1}{\pi}\left(\frac{\theta}{2}+\sin\frac{\theta}{2}\right)\dot{R}+\frac{1}{\pi}\left(\frac{\theta}{2}-\sin\frac{\theta}{2}\right)\dot{L} \qquad (5)$$

In Equations 2 to 5 inclusive the second term represents the cross talk equipment. Since the demodulated output by means of the switching method inherently contains the cross talk component some other means must be provided in order to sufficiently separate the components.

Figure 2:
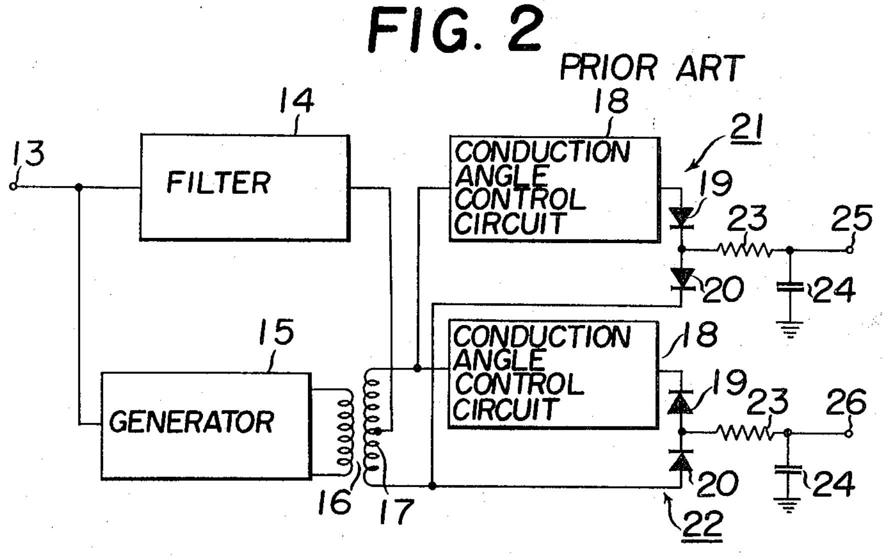
FIG. 2 PRIOR ART
FIG. 2 represents a circuit diagram of a conventional demodulating device for stereophonic composite signals utilizing the switching method.

FIG. 2 shows a prior art circuit diagram which has been used to minimize the angle of switch conduction so as to obtain the required high degree of separation. The stereo composite signals appearing at the input terminal 13 are simultaneously applied to a filter 14 for removing the SCA sub-carrier and to a generator 15 of the synchronizing carrier wave for insertion. The stereophonic sub-channel signal produced by the filter 14 is impressed upon the middle tap on the secondary winding 17 of a transformer 16 connected across the output of the generator 15. On the other hand the generator 15 generates a sub-carrier signal under the control of a pilot sub-carrier contained in the composite signal. The sub-carrier voltage induced in the secondary winding 17 of said transformer 16 is utilized to drive independent switching circuits 21 and 22 which are connected in parallel across the secondary winding 17 of the transformer 16, each of said switching circuits including a conduction angle control circuit 18 and a pair of diodes 19 and 20 of the opposite polarities. It will be clear that the switching demodulating operation is effected at the frequency of the sub-carrier to alternately apply the components of the composite signal to the output terminals 25 and 26 which are respectively connected to the junction between the diodes 19 and 20 through a filter circuit comprising a resistor 23 and a condenser 24. Reduction of the conduction angle can be realized at a large surface of the demodulating efficiency, yet it is very difficult to variably control the conduction angle. In addition, this method is disadvantageous in that it has no ability for compensating the degree of separation with regard to the phase shift of the inserted sub-carrier.

Accordingly, it is the principal object of this invention to provide a novel demodulating device for stereophonic composite signals without accompanying various disadvantages described above.

Another object of this invention is to provide a demodulating device having a good separation control ability over a wide range.

Still further object of this invention is to provide a novel stereophonic composite signal demodulating device which can be fabricated with less components than that required in prior devices and can operate at a high efficiency.

Further objects of this invention are distinctly pointed out in the appended claim and will become apparent from the following detailed explanation by referring to the accompanying drawing illustrating preferred embodiments constructed in accordance with this invention.

Referring now to FIGI. 3 illustrating one preferred embodiment of this invention wherein opposite terminals of a sub-carrier source $G_0$ for insertion are connected to the primary winding 28 of a transformer 27, the secondary winding 29 thereof being connected to the input terminals $c$ and $d$ of a switching circuit 34 comprising bridge connected diodes 30, 31, 32 and 33, and the middle tap of the secondary winding being grounded through a composite signal source $G_1$. Across the output terminals A and B which are respectively connected to the remaining terminals $a$ and $b$, respectively, of the switching circuit 34, there is connected a series circuit including resistors 35 and 36, the junction between them being grounded through the other composite signal $G_2$.

Figure 3:
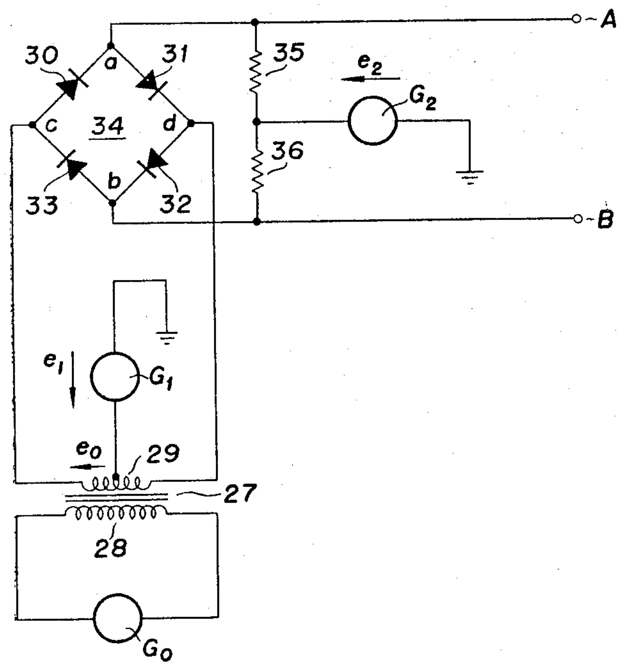
FIG. 3 shows a circuit diagram useful to explain the principle of this invention.

The operation of the device shown in FIG. 3 is as follows: It is assumed that the diodes of the switching circuit are poled such that they exhibit a short circuit condition for the forward current but exhibit an open circuit condition for backward or reverse current. The sub-carrier source $G_0$ will induce a sub-carrier voltage $e_0=E_0 \cos \omega_s t$ across the secondary winding 29 of the transformer 27, the composite signal source $G_1$ generates a composite signal voltage $e_1=(L+R)+(L-R) \cos \omega_s t$, the other composite signal source $G_2$ generates a separate composite signal $e_2=-m\{(\dot{L}+\dot{R})+(\dot{L}-\dot{R}) \cos \omega_s t\}$.

If it is assumed that the composite signal voltages are such that $e_1=0$, $e_2=0$ and that only the sub-carrier voltage for insertion $e_0$ is present, then during the positive half cycle of the sub-carrier $e_0=E_0 \cos \omega_s t$ appearing across the secondary winding 29 of the transformer 27, the diodes 30 and 31 will be biassed in the forward direction to provide the short circuit condition whereas the diodes 32 and 33 biassed in the reverse direction thus assuming the open circuit condition. During the negative half cycle of the sub-carrier voltage $e_0$ the conditions are reversed, i.e. the diodes 30, 31 will assume the open circuit condition, whereas the diodes 32, 33 the short circuit condition. Thus the switching circuit 34 comprising four bridge connected diodes is driven by the sub-carrier voltage to provide the desired switching operation. It will be understood that the output terminals $a$ and $b$ of the switching circuit 34 constitute the balanced points with respect to the sub-carrier voltage and that the potentials of these terminals are constant, or zero with respect to ground so that no sub-carrier wave voltage will appear across the output terminals A and B.

When the composite signal voltage $e_1$ is present at the time when the diodes are effecting the switching operation under the control of the sub-carrier voltage as described in the just preceding paragraph the composite signal voltage $e_1$ will act upon the diodes 30 and 31 during positive half cycles of the sub-carrier voltage $e_0=E_0 \cos \omega_s t$ to produce a potential at the terminal $a$ of the switching circuit 34 so that a current will flow through the resistor 35 to provide the composite signal voltage $e_1$ for the output terminal A. On the other hand, during the negative half cycles the composite signal voltage $e_1$ will act upon the diodes 32 and 33 to produce potential at the other terminal $b$ of the switching circuit so that a current will flow through the resistance 36 to provide the composite signal voltage $e_1$ for the other output terminal B.

Thus, the audio frequency signal voltages $V_{Ae1}$ and $V_{Be1}$ at the output terminals A and B by the composite signal voltage $e_1$ can be expressed as follows:

$$V_{Ae1}=\frac{1}{2}(\dot{L}+\dot{R})+\frac{1}{\pi}(\dot{L}-\dot{R}) \quad (6)$$

$$V_{Be1}=\frac{1}{2}(\dot{L}+\dot{R})-\frac{1}{\pi}(\dot{L}-\dot{R}) \quad (7)$$

If the composite signal voltage $e_2$ were present when the diodes are operating, one of the output terminals $a$ of the switching circuit would be grounded through the diodes 30 and 31 and the secondary winding 29 of the transformer 27 during the positive half cycles of the sub-carrier voltage $e_0=E_0 \cos \omega_s t$, whereas the other output terminal $b$ would be open circuited with respect to the ground. On the contrary, during the negative half cycles, the output terminal $a$ will be open circuited and the other output terminal $b$ grounded. In this case although the middle point of the secondary winding of the transformer is grounded the fluxes produced by the signal currents flowing through the secondary winding cancels each other thus exhibiting no inductance against the composite signal current. Accordingly the audio frequency signal voltages $V_{Ae2}$ and $V_{Be2}$ produced at the output terminals A and B, respectively, by the action of the resistors 35, 36 and the switching action of the diodes can be expressed by the following equations:

$$V_{Ae2}=-m\left\{\frac{1}{2}(\dot{L}+\dot{R})-\frac{1}{\pi}(\dot{L}-\dot{R})\right\} \quad (8)$$

$$V_{Be2}=-m\left\{\frac{1}{2}(\dot{L}+\dot{R})+\frac{1}{\pi}(\dot{L}-\dot{R})\right\} \quad (9)$$

From the above description it will be noted that when both of the composite signals $e_1$ and $e_2$ present simultaneously, the audio frequency signal voltages $V_A$ and $V_B$ appearing at the output terminals A and B can be represented as follows:

$$V_A=\left\{\frac{1}{2}(1-m)+\frac{1}{\pi}(1+m)\right\}\dot{L}+\left\{\frac{1}{2}(1-m)-\frac{1}{\pi}(1+m)\right\}\dot{R} \quad (10)$$

$$V_B=\left\{\frac{1}{2}(1-m)+\frac{1}{\pi}(1+m)\right\}\dot{R}+\left\{\frac{1}{2}(1-m)-\frac{1}{\pi}(1+m)\right\}\dot{L} \quad (11)$$

In Equations 10 and 11 if it is assumed that the amplitude ratio $m$ between composite signal voltages $e_1$ and $e_2$ is expressed by:

$$m=\frac{\pi-2}{\pi+2}$$

then $$V_A=\frac{4}{2+\pi}\dot{L} \quad (12)$$

and $$V_B=\frac{4}{2+\pi}\dot{R} \quad (13)$$

Thus completely separated left and right signals are obtained at the output terminals A and B respectively.

Figure 4:
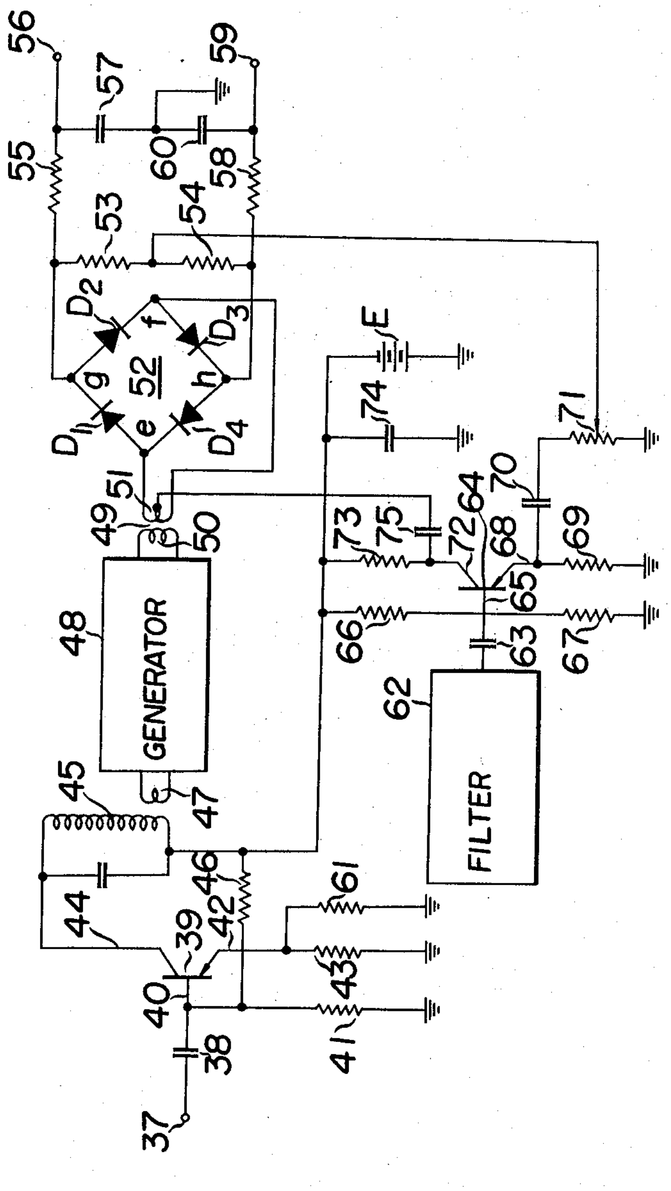
FIG. 4 shows a circait diagram illustrating one example of the demodulating device for stereo composite signals constructed in accordance with this invention.

In FIG. 4 there is shown a circuit diagram of a stereo composite signal demodulating device embodying the principle of this invention wherein an input terminal 37 is coupled to the base electrode 40 of a transistor 39 through a coupling condenser and this terminal is also grounded through a resistor 41. The emitter electrode 42 of the transistor 39 is connected to the ground via a resistor 43, while the collector electrode 44 of the transistor 39 is connected to one terminal of a first transformer 45 which is tuned to the pilot sub-carrier frequency, the other terminal of the transformer 45 being connected through a resistor 46 to the base electrode 40 of the transistor 39. The other terminal of the transformer 45 is also connected to one side of a direct current source E. The secondary winding 47 of the transformer 45 is connected to a generator 48 of a synchronizing sub-carrier for insertion with its output connected to the primary winding 50 of a second transformer 49. The secondary winding 51 of this transformer 49 is connected across the input terminals $e$ and $f$ of a switching circuit 52 including bridge connected diodes $D_1$, $D_2$, $D_3$ and $D_4$. Across the output terminals $g$ and $h$ of the switching circuit 52, are connected equal resistors 53 and 54 connected in series. Output terminals 56 and 57 respectively derived from said terminals $g$ and $h$ through resistors 55 and 58 are grounded through condensers 57 and 60, respectively. Further the emitter electrode 42 of the transistor 39 is connected to a filter 62 for removing SCA sub-carrier through a matching resistor 61, the output of the filter being coupled with the base electrode 65 of a transistor 64. The base electrode 65 is connected, on one hand, to the direct current source $e$ via a biassing resistor 66, and on the other hand, grounded through a biassing resistor 67. The emitter electrode 68 of the transistor 64 is connected to the ground through a biassing resistor 69. The emitter electrode 68 is also grounded through another circuit including a coupling condenser 70 and a variable attenuator 71, having a variable tap connected to the junction between said resistors 53 and 54. The collector electrode 72 of the transistor 64 is connected to the direct current source E through a load resistance 73. A condenser 74 is connected across the direct current source E. The collector electrode 72 of the transistor 64 is also connected to the middle tap of the secondary winding 51 of the second transformer 49 through a coupling condenser 75.

The stereophonic composite signal is applied from the input terminal 37 to the base electrode 40 and then to the collector electrode 44 of the transistor 39 in the first amplifier through the coupling condenser 38, it being understood that the transistor is maintained at its best operating condition by the action of biassing resistors 41, 43 and 46. Thus, the pilot sub-carrier voltage will be produced on the secondary side of the first transformer 45 which is tuned to the pilot sub-carrier frequency and the sub-carrier voltage will be supplied to the synchronizing sub-carrier generator 48 which produces a sub-carrier for insertion as the synchronizing signal. The sub-carrier voltage generated by the generator 48 functions to drive the switching circuit through the second transformer 49. On the other hand the sterophonic composite signal voltage produced at the emitter electrode 42 of the transistor 39 is relieved of its sub-carrier component for the subsidiary communication sub-channel by the action of the filter 62 for removing the subsidiary communication sub-carrier wave and is then supplied through the coupling condenser 63 to the base electrode 65 of the transistor 64 in the second amplifier which is maintained at its best operating condition by means of the biassing resistors 66, 67 and 69.

The collector electrode 72 and the emitter electrode 68 of the transistor 64 produce composite signal voltages of opposite polarities, the composite signal voltage produced at the collector electrode 72 being coupled to the middle tap of the secondary winding of said second transformer 49 via the coupling condenser 75, whereas that produced at the emitter electrode 68 is coupled to the junction between resistors 53 and 54 through the coupling condenser 70 and through a portion of the variable attenuator 71 for controlling the channel separation whereby to effect demodulation according to the principle described hereinabove. The amplitude ratio between two composite signal voltages having opposite polarities and supplied to the switching circuit can be varied properly by means of the variable separation attenuator while the higher frequency components of the output from the switching circuit 52 is attenuated by the action of integrating circuits 55, 57; 58, 60 each comprising a resistor and a condenser thus providing at the two output terminals 56 and 59 completely separated left and right audio frequency signals.

For example when a resistor 73 of 8.2KΩ, a resistor 69 of 1KΩ, a resistor 71 of 5KΩ, the resistors 53 and 54 of 3.9KΩ, respectively, and the coupling condensers 70 and 75 of 40 μf., respectively, are used, an efficiency of separation of over 30 db was obtained over a signal frequency range of from 100 to 8000 cycles per second and an efficiency of separation of over 20 db was obtained over a signal frequency range from 50 to 15,000 cycles per second. To illustrate the range of separation control, the sub-channel could control up to −10 db with respect to the normal level. Since the range of separation is determined by the range of varying the amplitude ratio between two composite signals having opposite polarities and supplied to the switching circuit it is possible to provide any desired range of separation control by proper selection of the value of the load resistors 69 and 73 respectively connected with the emitter electrode 68 and the collector electrode 72 of the transistor 64.

The same result as above described can be expected even when the variable attenuator for separation control is connected on the collector side. It should also be understood that the amplifier elements are not necessarily be limited to transistors. When using vacuum tubes, a resistor having fixed value may be connected in series with each diode in order to prevent lowering of the degree of balance caused by the difference in the diode characteristics and further to render more accurate the switching operation of the diode, thus providing the same function of the preferred embodiment of this invention.

Thus this invention provides a novel demodulating device for stereophonic composite signals which can separate the signals over a wide range without accompanying difficulties encountered in the previous devices by adopting demodulation by switching method more particularly by applying to the switching circuit comprising diodes a sub-carrier voltage together with a stereophonic composite signal in a manner above described.

While the principles of this invention have been set forth in terms of a specific embodiment, they are not to be regarded as limited in any way to particular embodiment but are to be interpreted broadly within the scope of the appended claim.

What is claimed is:

An FM stereophonic demodulating device, comprising:

a first transistor amplifier including emitter, base and collector electrodes, an input side to receive a stereo composite signal, a coupling capacitor for coupling the input side to the base electrode which is grounded through a base resistor, the emitter electrode being connected to ground through an emitter resistor;

a first transformer having an LC primary which is tuned to a predetermined pilot sub-carrier frequency of said composite signal, and a secondary, one terminal of said primary being connected to the collector electrode of said first transistor amplifier, the other terminal being connected to the base electrode across a resistor and being fed by a D.C. source line;

a generator for generating a sub-carrier voltage, fed by the terminals of the secondary of said first transformer;

a second transformer with a primary and a center-tapped secondary with end leads, the primary receiving the input from said generator;

a four leg diode ring switching circuit driven by said generated sub-carrier voltage, with input leads at one pair of diagonal ends, said input leads being connected to said second transformer secondary end leads, a pair of series resistors of equal value joined at a junction connected across the other pair of diagonal ends which serve as the output ends, output leads extending from said output ends, resistors in said output leads and connections to ground from said output leads across first and second capacitors;

a filter for removing the signal sub-carrier connected to said first transistor amplifier emitter across a matching resistor; and, a second transistor amplifier including emitter, base and collector electrodes wherein said emitter and collector electrodes produce composite signal voltages of equal but opposite polarities, said filter being coupled to said second transistor base electrode across a capacitor, a first base lead line from said base electrode to said D.C. source line across a first base resistor, a second base lead line to ground across a second base resistor, the emitter electrode being connected to ground through an emitter resistor across an emitter lead line, the composite signal voltage in one polarity being applied from said emitter electrode to the junction of the pair of series resistors connected across the output ends of the four leg diode ring switching circuit through a circuit having a grounded coupling capacitor and a potentiometer with a center tap acting as a variable attenuator, the center tap being connected to said junction, the collector electrode being connected to said D.C. source across a collector resistor, and said composite signal in the other polarity being applied from the collector to the center tap of said second transformer secondary through a coupling capacitor.

References Cited by the Examiner

UNITED STATES PATENTS

| | | | |
|---|---|---|---|
| 3,070,662 | 12/1962 | Eilers | 179—15 |
| 3,146,311 | 8/1964 | Wolff | 179—15 |
| 3,167,615 | 1/1965 | Wilhelm et al. | 179—15 |

DAVID G. REDINBAUGH, *Primary Examiner.*

ROBERT L. GRIFFIN, *Examiner.*